(12) United States Patent
Yagi et al.

(10) Patent No.: US 6,441,588 B1
(45) Date of Patent: Aug. 27, 2002

(54) BATTERY CHARGING CONTROL METHOD EMPLOYING PULSED CHARGING AND DISCHARGING OPERATION FOR HEATING LOW-TEMPERATURE BATTERY

(75) Inventors: Kazuhiko Yagi; Takashi Ishikura, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/973,751

(22) Filed: Oct. 11, 2001

(30) Foreign Application Priority Data

Oct. 12, 2000 (JP) .................................. 2000-312549

(51) Int. Cl.$^7$ .................................................. H02J 7/04
(52) U.S. Cl. .................................... 320/139; 320/150
(58) Field of Search ........................... 320/139, 137, 320/153, 154, 150

(56) References Cited

U.S. PATENT DOCUMENTS 4,554,500 A * 11/1985 Sokira ........................ 320/139
5,900,718 A * 5/1999 Tsenter ....................... 320/151

* cited by examiner

*Primary Examiner*—Gregory Toatley
*Assistant Examiner*—Lawrence Luk
(74) *Attorney, Agent, or Firm*—Arent Fox Kintner Plotkin & Kahn, PLLC

(57) ABSTRACT

A battery charging control method is disclosed, which can reduce the charging time a low-temperature battery without providing an additional heating system. The method includes executing a first pulsed charging and discharging operation when the battery temperature T is lower than a first predetermined temperature (e.g., 0° C.), wherein the amount of charging is equal to the amount of discharging; and switching from the first pulsed charging and discharging operation to a second pulsed charging and discharging operation when the battery temperature exceeds the first predetermined temperature, wherein in the second pulsed charging and discharging operation, the amount of discharging is less than the amount of charging. Therefore, it is possible to accomplish not only heating but also charging. When the battery temperature T exceeds a second predetermined temperature (e.g., 10° C.), a normal charging operation is performed.

6 Claims, 6 Drawing Sheets

BATTERY CHARGING CONTROL METHOD EMPLOYING PULSED CHARGING AND DISCHARGING OPERATION FOR HEATING LOW-TEMPERATURE BATTERY

BACKGROUND OF THE INVENTION

1. Field of the Invention

The present invention relates to a battery charging control method, and in particular, to a technique effective for reducing the time necessary for charging a low-temperature battery.

2. Description of the Related Art

Conventionally, hybrid vehicles employing a motor in addition to the engine as a driving source, or electric vehicles employing only a motor as a driving source, are known.

The motors of such vehicles are driven by electric power supplied from a battery; thus, when the remaining charge of the battery decreases, the battery must be charged.

In order to charge a battery which has discharged electricity, it is recommended to charge the battery at one tenth of its rated amount (i.e., 0.1 C.) for approximately 10 hours, and rapid charging of batteries is rarely performed because such rapid charging may cause degradation of the battery and reduction of the battery life.

In particular, the batteries of electric vehicles are generally charged by electric power supplied at night, and the charged power is used in the next day.

However, rapid charging of the battery is still required when a driver has an urgent need to use the vehicle at night, or when a driver wants to extend the driving distance by recharging the battery.

For rapid battery charging, if the battery temperature is below an appropriate range of temperatures for battery charging, that is, lower than Tmin in FIG. 10, the conductivity of the electrolyte decreases and the resistance of the electrolyte rapidly increases, thereby increasing the voltage for charging (see the voltage V in FIG. 10).

In particular, the resistance of lithium organic-solvent electrolytes at room temperature is higher than that of aqueous-solution-type electrolytes; thus, the rate of increase of the resistance of lithium organic-solvent electrolytes is very high at low temperatures.

In order to prevent the electrolyte from decomposing due to an increase of the charging voltage (in the case of a lithium battery), or to prevent the generation of gaseous oxygen (in the case of an alkali battery), an upper limit of the charging voltage is determined, and if the charging voltage exceeds the upper limit (see Vmax in FIG. 10), the charging current (see current I in FIG. 10) is decreased so as to perform constant-power charging. Accordingly, the charging operation requires a long time, or the amount of charging may not be sufficient.

In order to solve these problems, a charging control method, in which the charging operation is started after the battery is heated using a heater or the like, may be employed. However, in this method, a dedicated heating system is necessary.

Therefore, when a battery is built into a hybrid vehicle or an electric vehicle, a space for providing a heating system must be secured in the layout of the vehicle, and additionally, the weight of the vehicle increases. As a result of these drawbacks, this method is not preferable.

SUMMARY OF THE INVENTION

In consideration of the above circumstances, an object of the present invention is to provide a battery charging control method for reducing the time necessary for charging a battery at a low temperature without providing an additional heating system.

Therefore, the present invention provides a battery charging control method wherein when the temperature of a battery is lower than a predetermined temperature (e.g., 10° C. in the embodiment explained below), the battery is first heated by a pulsed charging and discharging operation comprising alternately executing charging and discharging operations, before the battery is charged.

According to this method, the battery is heated due to a heating effect based on Joule heat ($=I^2 \times R$, where I denotes the current and R denotes the internal resistance) while the heat related to chemical reactions during charging (i.e., exothermic reaction) and the heat related to chemical reactions during discharging (i.e., endothermic reaction) cancel each other. Therefore, the resistance of the electrolyte is reduced and a rapid increase of the voltage during charging is prevented. Therefore, a battery at a low temperature can be charged in a short time.

The present invention also provides a battery charging control method comprising the steps of:

executing a first pulsed charging and discharging operation when the temperature of a battery is lower than a first predetermined temperature (e.g., 0° C. in the embodiment explained below), wherein in the first pulsed charging and discharging operation, the amount of charging is equal to the amount of discharging; and switching from the first pulsed charging and discharging operation to a second pulsed charging and discharging operation when the temperature of the battery exceeds the first predetermined temperature, wherein in the second pulsed charging and discharging operation, the amount of discharging is less than the amount of charging.

According to this method, when the temperature of the battery is lower than the first predetermined temperature, the battery is heated due to a heating effect based on Joule heat. Therefore, the resistance of the electrolyte is reduced and a rapid increase of the voltage during charging is prevented. When the temperature of the battery exceeds the first predetermined temperature, the operation is switched from the first pulsed charging and discharging operation under the condition "the amount of charging=the amount of discharging" to the second pulsed charging and discharging operation under the condition "the amount of charging>the amount of discharging"; thus, accomplishing not only heating but also charging. Therefore, a battery at a low temperature can be charged in a shorter time.

Preferably, in the first pulsed charging and discharging operation, for lower temperatures of the battery, a set amount of charging in the charging interval and a set amount of discharging in the discharging interval are chosen to be smaller.

Accordingly, for lower temperatures of the battery (i.e., for larger resistances of the electrolyte), the amount of charging is set smaller, thereby very reliably preventing an increase of the voltage of a low-temperature battery being charged.

Typically, in the second pulsed charging and discharging operation, a set amount of discharging is determined by adjusting at least one of a pulse width and a pulse amplitude. Accordingly, the amount of pulsed discharging can be flexibly determined by suitably restricting the charging time or charging current of each pulse, and various user demands for charging control can be satisfied.

Also typically, the method further comprises the step of switching from the second pulsed charging and discharging operation to a normal charging operation of charging the battery at a continuous current when the temperature of the battery exceeds a second predetermined temperature (e.g., 10° C. in the embodiment explained below).

DESCRIPTION OF THE PREFERRED EMBODIMENTS

Hereinafter, an embodiment of the battery charging control method according to the present invention will be explained in detail with reference to the drawings.

Figure 1:
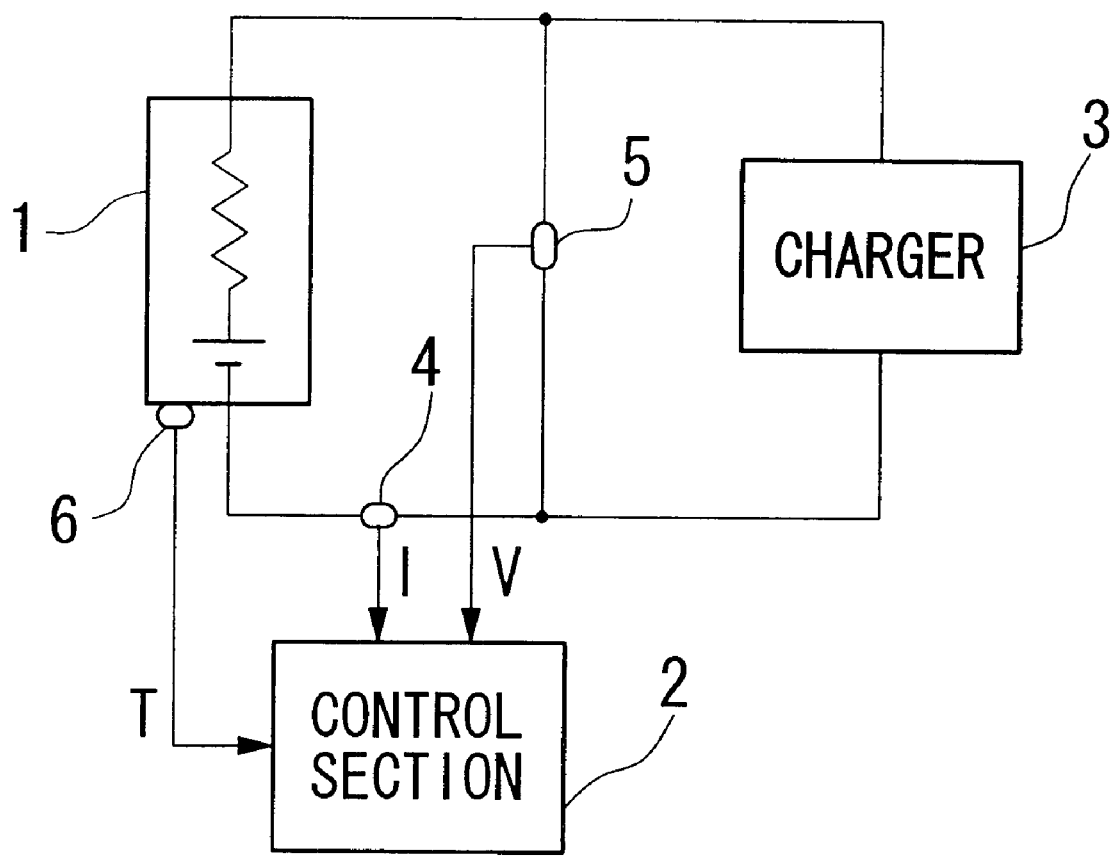
FIG. 1 is a diagram showing the structure of a charging control apparatus used for implementing the battery charging control method according to the present invention.

A charging control apparatus for implementing the relevant battery charging control method is typically used for charging a battery 1 (see FIG. 1) which supplies electric power to a load such as a motor built into an electric or hybrid vehicle. As shown in FIG. 1, the charging control apparatus comprises a control section 2, a charger 3, a current sensor 4, a voltage sensor 5, and a temperature sensor 6.

The current sensor 4 detects the discharge current supplied from the battery 1 to a load such as a motor or generator and also detects the charge current supplied from the load to the battery 1. The voltage sensor 5 detects the terminal voltage of the battery 1. The temperature sensor 6 detects the temperature of the battery 1. A signal corresponding to the current I from the current sensor 4, a signal corresponding to the voltage V from the voltage sensor 5, and a signal corresponding to the battery temperature T from the temperature sensor 6 are input into the control section 2.

Below, the battery charging control method of the present embodiment will be explained with reference to the flowchart in FIG. 2.

Figure 2:
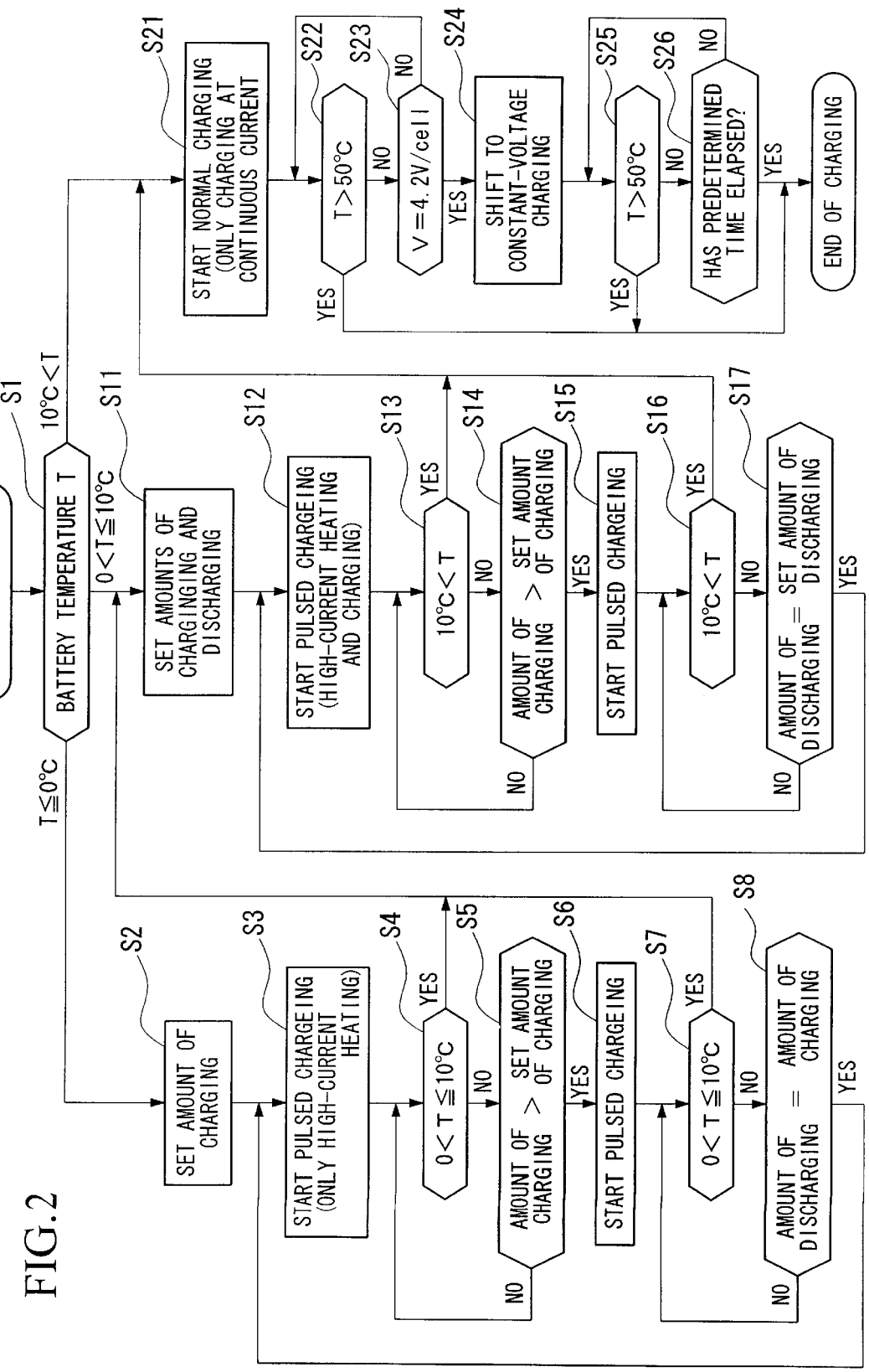
FIG. 2 is a flowchart showing an embodiment of the battery charging control method according to the present invention.

The flowchart of FIG. 2 shows the flow of the charge control operation performed by the control section 2. In step S1 of this flow, the temperature range in which the battery temperature (detected by the temperature sensor 6) falls is determined.

When the battery temperature $T \leq 0°$ C. (corresponding to the first predetermined temperature of the present invention), that is, when the battery temperature T falls within a range below the appropriate temperatures for battery charging, if the battery temperature T falls within a lower part of the lower range, then the operation proceeds to step S2 where a first pulsed charging and discharging operation is executed, while if battery temperature T falls within un upper part of the lower range, then the operation proceeds to step S11 where a second pulsed charging and discharging operation is executed. When the battery temperature $T > 10°$ C., that is, when the battery temperature T falls within a temperature range appropriate for battery charging, the operation proceeds to step S21 where a normal charging operation is executed.

Figure 8:
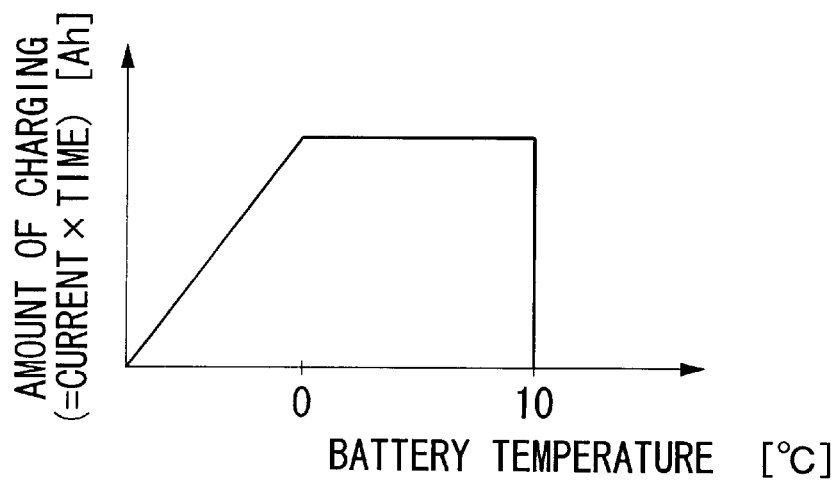
FIG. 8 is a chart showing the relationship between the battery temperature and the amount of the pulsed charging, which shows the amount of the pulsed charging determined according to the battery temperature.

In step S2, a chart (or map) showing the relationship between the battery temperature and the amount of the pulsed charging is referred to, and the amount Ah of the pulsed charging suitable for the battery temperature T is determined. This chart is stored in the control section 2 in advance. FIG. 8 shows an example of this chart, wherein in the range of "battery temperature $T \leq 0°$ C.", the lower the battery temperature T, the smaller the amount of charging within the pulsed charging interval and the amount of discharging within the pulsed discharging interval with respect to the pulsed charging and discharging operation.

In steps S3 to S5, the pulsed charging operation at the set amount of charging determined in step S2 is executed. In this operation, a current I (having a certain pulse amplitude) is determined so as to satisfy the condition that the voltage V detected by the voltage sensor 5 does not exceed the upper limit voltage (Vmax) of the battery 1.

In lithium batteries, this upper limit voltage indicates a voltage at which the electrolyte may be decomposed, while in alkali batteries, this upper limit voltage indicates a voltage at which gaseous oxygen may be generated. In the present flow, the upper limit voltage is set to be 4.2 V/cell.

At the same time as the start of the pulsed charging in step S3, a timer provided in the control section 2 is activated, to start measuring the charging time (corresponding to the pulse width). Here, in step S3, the pulsed charging is only used for heating the battery 1.

In step S4, it is determined whether the following condition is satisfied:

$$0° \text{ C.} < \text{battery temperature } T \leq 10° \text{ C.}$$

If the result of the determination is "YES", that is, when the battery 1 has been heated to a certain temperature and thus a slight amount of charging is possible under the upper limit voltage Vmax, then the operation proceeds to step S12. If the result of the determination is "NO", then the operation proceeds to step S5.

In step S5, it is determined whether the amount of charging, obtained by multiplying the current I detected by the current sensor 4 by the charging time measured by the above-explained timer, is larger than the set amount of charging which has been determined in step S2. If the result of the determination is "YES", that is, when the present interval of the pulsed charging has been completed, then the operation proceeds to step S6 where a pulsed discharging operation is started. If the result of the determination is "NO", that is, when the pulsed charging interval has not yet been completed, the operation returns to step S3.

In the following operation from step S6 to step S8, an amount of the pulsed discharging equal to the amount of the pulsed charging (executed in steps S3 to S5) is discharged. More specifically, in step S6, the pulsed discharging is started, in which an amount of current equal to that of the charged current is discharged during a time equal to the charging time (refer to FIG. 3). At the same time of the operation start, the timer value indicating the charging time is stored in memory and then the timer value is reset to start measuring the discharging time.

Similar to step S4, in step S7, it is determined whether the condition "0° C.<battery temperature T≦10° C." is satisfied.

If the result of the determination is "YES", the operation proceeds to step S11, while if the result of the determination is "NO", the operation proceeds to step S8.

In step S8, it is determined whether the amount of discharging, obtained by multiplying the current I (detected by the current sensor 4) by the discharging time (measured by the above-explained timer), is equal to the amount of charging by the pulsed charging performed from step S3 to step S5 (i.e., current I×timer value stored in memory). If the result of the determination is "YES", that is, when the present interval of the pulsed discharging has been completed, the operation returns to step S3, while if the result of the determination is "NO", then the operation returns to step S6.

In step S11, which is executed if the condition "0° C.<battery temperature T≦10° C." is satisfied in any one of steps S1, S4, and S7, the amount of the pulsed charging is determined by referring to the above-explained chart of the relationship between the battery temperature and the amount of pulsed charging (see FIG. 8).

As shown in this chart, in the range of "0° C.<battery temperature T≦0° C.", a fixed amount of pulsed charging is set regardless of the battery temperature T.

In the above step S11, both the amount of pulsed charging and the amount of pulsed discharging are determined. This is because in the range of "0° C.<battery temperature T≦10° C.", instead of executing the pulsed charging and discharging operation under the conditions that "the amount of charging=the amount of discharging" (which is performed only for heating the battery), a "charge-trend" pulsed charging/discharging operation is performed so as to perform both heating and charging. Therefore, in step S11, a smaller amount of pulsed discharging is determined in comparison with the amount of pulsed charging (refer to FIG. 4).

In the operation from step S12 to step S14, pulsed charging corresponding to the set amount of charging determined in step S11 is performed. Similar to the operation from step S3 to step S5, in step S12, the current I is determined so as to satisfy the condition that the voltage V detected by the voltage sensor 5 does not exceed the upper limit voltage Vmax of the battery 1. At the same time of the start of the charging in step S12, the timer is activated to start measuring the charging time.

In step S13, it is determined whether the condition "10° C.<battery temperature T" is satisfied. If the result of the determination is "YES", that is, when the battery temperature T has increased to an appropriate temperature range for the charging operation and thus heating using the pulsed charging and discharging operation is unnecessary, then the operation proceeds to step S14, while if the result of the determination is "NO", the operation proceeds to step S21.

Similar to step S5, in step S14, it is determined whether the condition of "the amount of charging>the set amount of charging". If the result of the determination is "YES", the operation proceeds to step S15 to start the pulsed discharging, while if the result of the determination is "NO", the operation returns to step S13.

In the operation from step S15 to S17, a pulsed discharging operation is performed, in which a smaller amount of pulsed discharging is employed in comparison with the amount of pulsed charging performed in steps S12 to S14.

Figure 4:
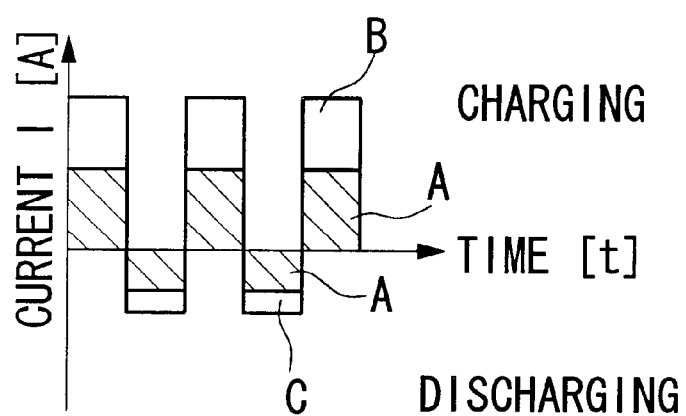
FIG. 4 is a time chart showing a waveform employed in the second pulsed charging and discharging operation.

That is, in step S15, a pulsed discharging operation is started, in which a current smaller than the charging current is discharged during a time equal to the charging time (refer to FIG. 4). At the same time of the start of the discharging, the previous timer value which indicates the charging time is stored in memory and the timer is then reset, so that the measuring of the discharging time is started.

Similar to step S13, in step S16, it is determined whether the condition "10° C.<battery temperature T" is satisfied. If the result of the determination is "YES", the operation proceeds to step S21, while if the result of the determination is "NO", then the operation proceeds to step S17.

In step S17, it is determined whether the amount of discharging, obtained by multiplying the current I detected by the current sensor 4 by the discharging time measured by the timer, is equal to the set amount of discharging determined in step S11. If the result of the determination is "YES", that is, when the present interval of the pulsed discharging has been completed, the operation returns to step S12, while if the result of the determination is "NO", the operation returns to step S16.

Figure 5:
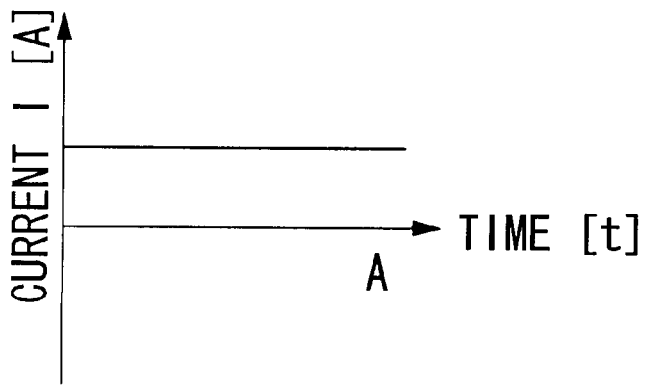
FIG. 5 is a time chart showing an example of the normal charging operation.

If the condition "10° C.<battery temperature T" is satisfied in any one of steps S1, S13, and S16, that is, when the battery temperature T is within a temperature range appropriate for the charging operation and thus heating of battery by using the pulsed charging and discharging operation is unnecessary, then step S21 is executed. In step S21, normal charge is started, which employs only a continuous current as shown in FIG. 5.

In step S22, it is determined whether the condition "battery temperature T>50° C." is satisfied, where the battery temperature T is detected by the temperature sensor 6. In other words, in this step, it is determined whether the temperature T of the battery being charged is equal to or less than a predetermined temperature, so as to protect the battery and to perform efficient charging. If the result of the determination of step S22 is "YES", that is, when the battery temperature T exceeds the upper limit, which is set to 50° C., then the operation from step S23 to step S26 is skipped and the charging operation is terminated. If the result of the determination is "NO", then the operation proceeds to step S23.

In step S23, it is determined whether the voltage of the battery cell is 4.2 V/cell, by referring to the voltage V detected by the voltage sensor 5. If the result of the determination is "YES", that is, when the voltage of the cell has reached the above-explained upper limit voltage Vmax, the operation proceeds to step S24. If the result of the determination is "NO", the operation returns to step S22.

In step S24, the charge current is decreased so as to perform charging at a constant voltage. Simultaneously, the timer value is reset and the measuring of the charging time at constant voltage is started.

Similar to step S22, in step S25, it is determined whether the condition "battery temperature T>50° C." is satisfied. If the result of the determination is "YES", then step S26 is skipped and the charge is terminated, while if the result of the determination is "NO", then the operation proceeds to step S26.

In step S26, it is determined whether a predetermined time has elapsed from the start of the constant-voltage charge of step S24, by referring to the timer value. If the result of the determination is "NO", the operation returns to step S25, while if the result of the determination is "YES", then the charging operation is completed.

Figure 3:
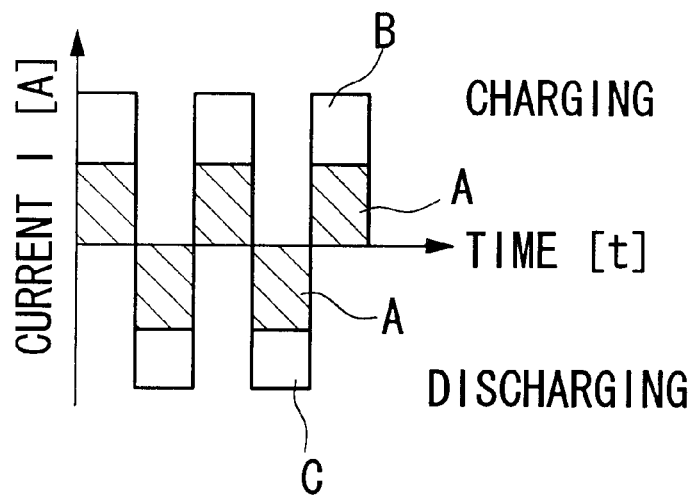
FIG. 3 is a time chart showing a waveform employed in the first pulsed charging and discharging operation.

Below, the functions of the battery charging control method of the present embodiment will be explained with reference to FIGS. 3, 4, and 9. In FIG. 3, the hatched (or shaded) portions indicated by reference symbol A are converted to Joule heat, the portions indicated by reference symbol B correspond to the actual amount of charging obtained by subtracting the amount converted to Joule heat (see portion A) from the apparent amount of charging, and the portions indicated by reference symbol C correspond to the actual amount of discharging obtained by subtracting the amount converted to Joule heat (see portion A) from the apparent amount of discharging.

If the battery temperature T is lower than the lower-limit temperature appropriate for the charging operation (10° C. in the present embodiment) and is further in a lower range (here, 0° C. or less) below the lower limit, the first pulsed charging and discharging operation is repeated, in which the amount of charging is equal to the amount of discharging (see FIGS. 3 and 9). Therefore, the battery 1 is heated by a heating effect due to the Joule heat, thereby preventing a voltage increase during charging.

In particular, the lower the battery temperature T, the smaller the set amount of pulsed charging. This amount of pulsed charging corresponds to the pulse area obtained by multiplying the pulse width (i.e., charging time) by the pulse amplitude (i.e., charging current). Accordingly, a voltage increase during the charging of a low-temperature battery can be reliably prevented.

During the first pulsed charging and discharging operation, the amount of charging is equal to the amount of discharging, as explained above. Therefore, the battery 1 is only heated and the remaining charge of the battery 1 is not increased.

Figure 9:
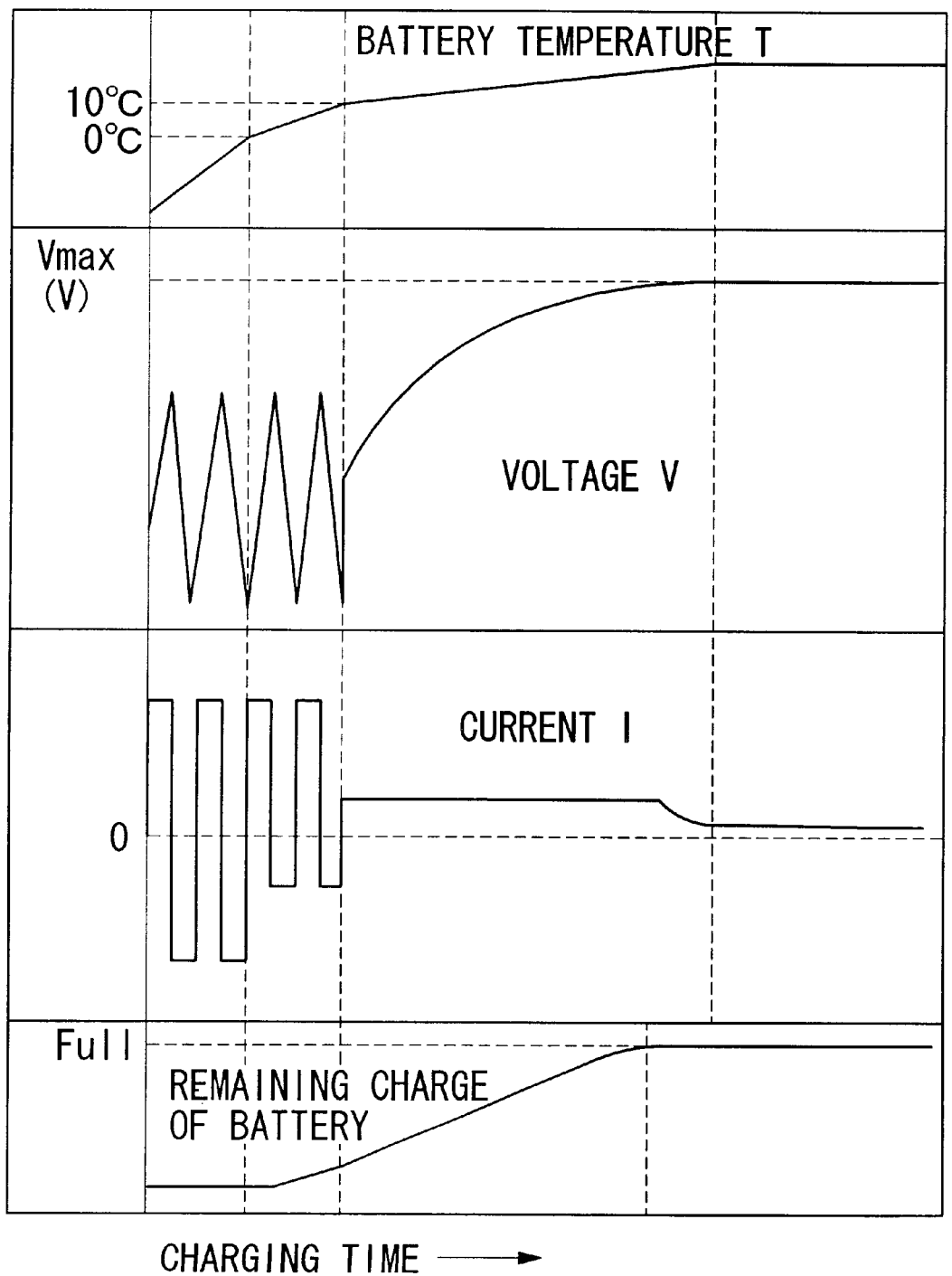
FIG. 9 is a time chart showing changes of the battery temperature, charged/discharged voltage, charged/discharged current, and remaining charge of the battery when the battery charging control method of the present invention is performed.
Figure 10:
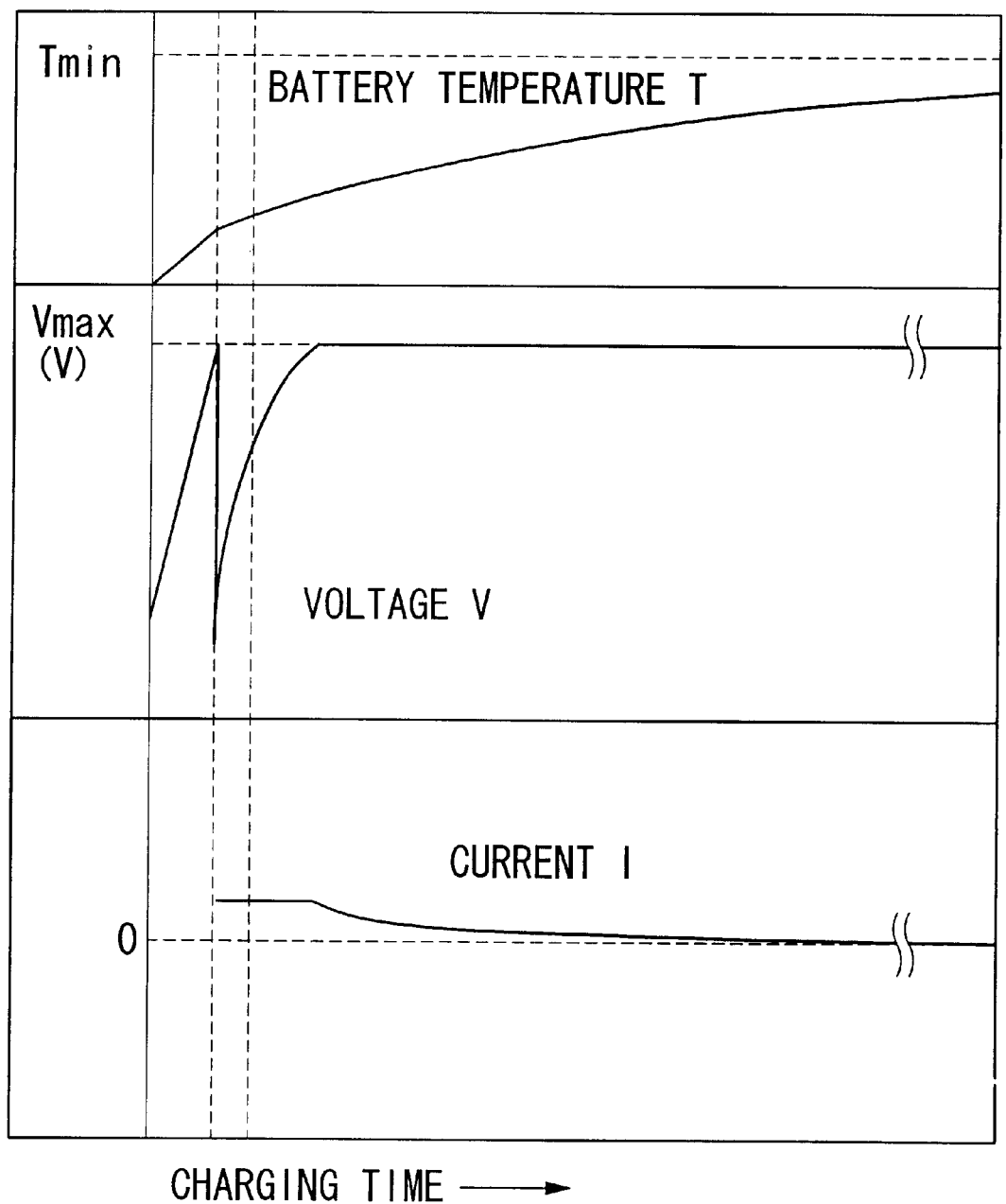
FIG. 10 is a time chart showing changes of the battery temperature, battery when a conventional charging control method is performed.

When the first pulsed charging and discharging operation has heated the battery to a temperature exceeding 0° C., the second pulsed charging and discharging operation is repeatedly performed, in which the amount of discharging is smaller than the amount of charging (refer to FIGS. 4 and 9). Therefore, charging is performed in addition to heating of battery in the second pulsed charging and discharging operation before the normal charging is performed. Accordingly, even when a battery at a low temperature is charged, the voltage V during the charging does not reach the upper limit voltage Vmax, so that a rapid charging operation can be completed in a short time.

The present invention is not limited to the above-explained embodiments, and the numerical values in the embodiments are merely examples and do not limit the present invention.

Figure 6:
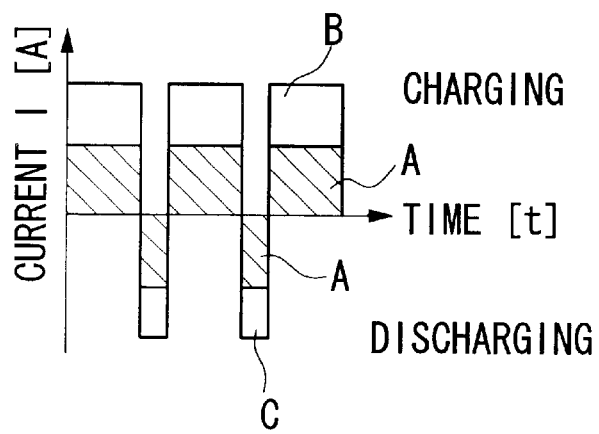
FIG. 6 is a time chart showing another waveform to be employed in the second pulsed charging and discharging operation.

For example, in the above embodiments, when the condition "0° C.<battery temperature T≦10° C." is satisfied, the current (i.e., pulse amplitude) of pulsed discharging is set to be smaller than the current of pulsed charging (see FIG. 4). However, as shown in FIG. 6, the discharging time (i.e., pulse width) may be shorter than the charging time.

Figure 7:
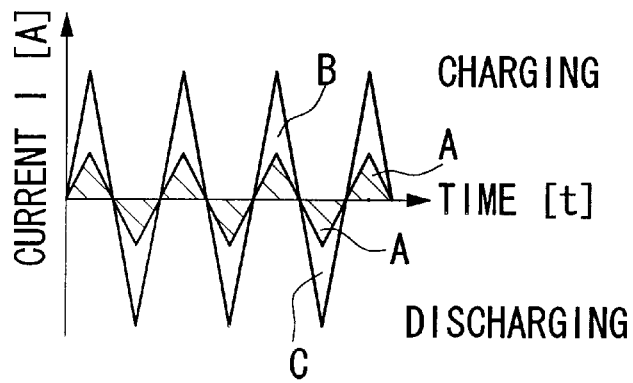
FIG. 7 is a time chart showing a current pattern used in a pulsed charging and discharging operation, which employs triangular waves.

In addition, the pattern of current of the pulsed charging and discharging operation is not limited to rectangular waves, and triangular waves (see FIG. 7) or other waveforms may be used.

Furthermore, even for a given kind of battery such as lithium batteries or alkali batteries, the first and second predetermined temperatures of the present invention can be flexibly modified according to individual differences.

What is claimed is:

1. A battery charging control method wherein when the temperature of a battery is lower than a predetermined temperature, the battery is first heated by a pulsed charging and discharging operation comprising alternately executing charging and discharging operations, before the battery is charged.

2. A battery charging control method comprising the steps of:

executing a first pulsed charging and discharging operation when the temperature of a battery is lower than a first predetermined temperature, wherein in the first pulsed charging and discharging operation, the amount of charging is equal to the amount of discharging; and switching from the first pulsed charging and discharging operation to a second pulsed charging and discharging operation when the temperature of the battery exceeds the first predetermined temperature, wherein in the second pulsed charging and discharging operation, the amount of discharging is less than the amount of charging.

3. A battery charging control method as claimed in claim 2, wherein in the first pulsed charging and discharging operation, for lower temperatures of the battery, a set amount of charging in the charging interval and a set amount of discharging in the discharging interval are chosen to be smaller.

4. A battery charging control method as claimed in claim 2, wherein in the second pulsed charging and discharging operation, a set amount of discharging is determined by adjusting at least one of a pulse width and a pulse amplitude.

5. A battery charging control method as claimed in claim 3, wherein in the second pulsed charging and discharging operation, the set amount of discharging is determined by adjusting at least one of a pulse width and a pulse amplitude.

6. A battery charging control method as claimed in claim 2, further comprising the steps of:

switching from the second pulsed charging and discharging operation to a normal charging operation of charging the battery at a continuous current when the temperature of the battery exceeds a second predetermined temperature.

\* \* \* \* \*